(12) United States Patent
De Guzmán Montón et al.

(10) Patent No.: US 12,313,034 B2
(45) Date of Patent: May 27, 2025

(54) FLOATING REINFORCED CONCRETE PLATFORM APPLICABLE TO THE MARINE WIND POWER SECTOR INDUSTRY

(71) Applicant: SEAPLACE, S.L., Madrid (ES)

(72) Inventors: Santiago De Guzmán Montón, Madrid (ES); Jaime Moreu Gamazo, Madrid (ES); Mirian Terceño Hernández, Madrid (ES); Pedro López Vizcayno, Madrid (ES); Caridad García Meroño, Madrid (ES); Salvador Delgado Franco, Madrid (ES); Óscar Pérez Díaz, Madrid (ES); Alberto Taboada Gosálvez, Madrid (ES); Alberto Negueruela Imaña, Madrid (ES); Daniel González López, Madrid (ES); Manuel Moreu Munaiz, Madrid (ES)

(73) Assignee: SEAPLACE, S.L., Madrid (ES)

( * ) Notice: Subject to any disclaimer, the term of this patent is extended or adjusted under 35 U.S.C. 154(b) by 264 days.

(21) Appl. No.: 17/998,160

(22) PCT Filed: Apr. 30, 2021

(86) PCT No.: PCT/ES2021/070300
§ 371 (c)(1),
(2) Date: Nov. 8, 2022

(87) PCT Pub. No.: WO2021/224525
PCT Pub. Date: Nov. 11, 2021

(65) Prior Publication Data
US 2023/0228247 A1 Jul. 20, 2023
US 2023/0392582 A2 Dec. 7, 2023

(30) Foreign Application Priority Data

May 8, 2020 (ES) .............................. ES202030418

(51) Int. Cl.
*F03D 13/25* (2016.01)
*B63B 5/14* (2006.01)
(Continued)

(52) U.S. Cl.
CPC ................ *F03D 13/22* (2016.05); *B63B 5/14* (2013.01); *B63B 21/50* (2013.01); *F03D 13/25* (2016.05);
(Continued)

(58) Field of Classification Search
CPC . F03D 13/25; F03D 13/22; B63B 5/14; B63B 2035/442; E02D 27/425
See application file for complete search history.

(56) References Cited

U.S. PATENT DOCUMENTS 9,964,097 B2 * 5/2018 Dagher ................... F03D 13/22
2011/0158750 A1 * 6/2011 Reichel ................... E02B 17/02
405/205

(Continued)

FOREIGN PATENT DOCUMENTS

CN 106638662 A 5/2017
CN 110397066 A 11/2019
(Continued)

*Primary Examiner* — Sean D Andrish
(74) *Attorney, Agent, or Firm* — S.J. Intellectual Property LTD.

(57) ABSTRACT

The present invention relates to a solution for a floating wind platform made of reinforced concrete for mass production, characterized by a geometric design providing a hydrostatic natural prestressing to the concrete, causing it to work under compression. The structural response of the platform for working in the most effective mode is improved, and the occurrence of fractures or cracks in the concrete is prevented, which reduces permeability and allows for reducing the rebar to be contained in the structure, also increasing operational safety. Furthermore, the invention has a system for anchoring the mooring lines to the structure in the form (Continued)

of a truss made of reinforced concrete which evenly distributes mooring stresses, minimizing prestressing in the high area of the platform, and increasing the area for distributing shear forces due to the change in section between the platform and the tower of the wind turbine. The geometric design furthermore confers the versatility of being able to adopt low draft SPAR, semi-submersible, barge, or buoy solutions, with the wind turbine being installed such that it is centered or off-center on the structure, thereby being adapted to different draft requirements or environmental and logistics conditions.

8 Claims, 6 Drawing Sheets

(51) Int. Cl.
*B63B 21/50* (2006.01)
*F03D 13/20* (2016.01)
*B63B 35/44* (2006.01)

(52) U.S. Cl.
CPC ..... *B63B 2035/442* (2013.01); *F05B 2240/93* (2013.01)

(56) References Cited

U.S. PATENT DOCUMENTS

2012/0155967 A1  6/2012  Nagurny et al.
2022/0128034 A1* 4/2022  Krogenes ................ F03D 13/10

FOREIGN PATENT DOCUMENTS

| CN | 110453711 A | 11/2019 |
| GB | 2493023 A | 1/2013 |
| WO | 2014013098 A1 | 1/2014 |
| WO | 2019070140 A1 | 11/2019 |

* cited by examiner

Section A-A

FLOATING REINFORCED CONCRETE PLATFORM APPLICABLE TO THE MARINE WIND POWER SECTOR INDUSTRY

FIELD OF THE ART

The technical field of application of the present invention is that of floating platforms of the offshore wind industry.

The present invention consists of a floating platform made of reinforced concrete on which a wind turbine for producing wind power at sea is supported.

BACKGROUND OF THE INVENTION

The growth of renewable energies has created a trend which seeks to take greater advantage of such energies. With respect to wind power in particular, the trend that is observed is to install platforms at sea where wind speeds are higher (and less turbulent) than on land, thereby ensuring a higher production of power. These wind characteristics furthermore improve the farther away they are from the coast.

However, these sites have the drawback that in many cases, fixed platforms (platforms which are already economized and well known) are not competitive, whether because of irregularities in the seabed, the type of ground, or because they are located in areas with depths exceeding 60 meters. This leads to the most viable solutions now being floating platforms, with the subsequent change in cost due to the increased size of these solutions, the need for a mooring system and means for anchoring to the seabed, different offshore operations, new uncertainties, risks, etc. Furthermore, since these platforms are not fixed, they are exposed to the movements caused by the wind, the waves, and the current, which involve a reduction in wind turbine performance, an increased fatigue in structures supporting the wind turbine, resonances, etc. Floating platforms must therefore address a series of problems affecting them both in terms of their operation and during their construction, transport, and installation.

The trend in the sector up until 10 years ago was to use steel as the structural solution in building floating platforms. The main advantage from building with steel is the level of knowledge held concerning its behavior due to the experience obtained from steel structures in the oil and gas industry and from fixed steel platforms in the offshore wind industry. However, the use of steel has the drawback of being a material that is highly susceptible to corrosion, particularly in offshore settings, the volatility of prices, and a high acquisition and handling cost per ton compared to other materials. Furthermore, however, its production gives off about 2 tons of $CO_2$, a greenhouse gas, per ton of steel produced.

In a society that is becoming increasingly more conscientious of climate change, where agreements for reducing greenhouse gas emissions are being reached, it seems logical to consider other building materials that reduce emissions. As an example, the European Commission's goal for 2050 is to virtually eliminate $CO_2$ emissions. Therefore, in addition to a trend in producing power by renewable means, it is also necessary to find replacement materials in order to reach these goals. Concrete is the material most widely used around the world in construction. It has an essential advantage over steel, i.e., lower $CO_2$ emission during the construction process, as well as a lower platform cost. As a result, offshore wind solutions using concrete have been developed in the past decade.

Invention patent CN102358402A relates to a floating platform for the production and storage of hydrocarbons. The structure is formed by several bodies made of steel with a hexagonal shape arranged in the form of a honeycomb, with each of these bodies being a hydrocarbon storage tank, and wherein each tank shares its six walls with six other tanks. The fact that the tanks share walls means that the draft differences existing in contiguous tanks, and also the differences with the actual draft of the platform when it is floating at sea, causes a difference in pressures which subjects the structure to a series of forces. These forces, combined with the loads produced by external agents, such as the waves, require very thick walls if annular and longitudinal reinforcements to ensure the structural strength of the rig and to ensure that it does not collapse during operation are not provided. Since steel structures are an order of magnitude thinner than their concrete equivalents, they are much more susceptible to buckling. As a result, the necessary increase in thickness makes the solution more expensive, as a large amount of steel and a high number of necessary welds between panels are required. Furthermore, this structure is subject to considerable notable corrosion due to the increase in exposed steel surface, making maintenance of the rig more expensive. The present invention, consisting of vertical tanks having a quasi-cylindrical shape arranged in a staggered manner, uses reinforced concrete to prevent buckling and has openings in the middle of the structure which are directly connected to the sea. This favors load symmetry which causes the structure to work uniformly, regardless of the water fill level of the different tanks. Furthermore, it achieves a natural prestress state in the concrete, reducing fractures or cracks therein, improving the leak-tightness of the platform, and improving the structural strength in the event of asymmetrical loads, such as impacts from waves.

Despite the fact that reinforced concrete structures are used increasingly more in industry given their low material cost per ton and the ample experience acquired from using concrete in the civil construction industry, one of the main problems with concrete is its poor structural behavior when working under bending and tension conditions. To solve this problem, most solutions are based on using large amounts of framework in the reinforced concrete construction and applying prestressing processes to said concrete. In patent JP2014184863A, a steel structure arranged in the form of ribs within the concrete body is used for the purpose of providing axial prestressing to the concrete in order to improve its structural behavior. However, the use of mixed steel and concrete structures increases the cost and $CO_2$ emissions. Furthermore, the use of steel structures as a concrete reinforcement requires providing systems for controlling the corrosion caused by seawater, such as sacrificial anodes, impressed current systems, etc.

In patent WO2013155521A1, one of its embodiments describes a platform made of concrete based on several cylindrical bodies arranged concentrically around a central cylinder, also made of concrete, and attached thereto by means of different types of longitudinal steel structures. Solutions of this type, with several bodies attached to one another, require a high degree of local reinforcement in the attachment areas since they are the most sensitive to forces produced on the entire assembly as they are load transmission areas. The need to reinforce these areas involve a higher structural complexity of the device, concentrating the stress in isolated areas. The present invention is a structurally simpler solution as it actually involves a single body, eliminating additional attachment elements, and its structural behavior is optimized as stress concentration points in the structure are prevented. Furthermore, its very design causes the platform to work under compression, reducing the framework contained in the reinforced concrete to a minimum.

Another problem affecting floating platforms with wind turbines, particularly those made of reinforced concrete, is the sudden change in area in the section of the platform existing in the transition of the tower of the wind turbine to the concrete body of the platform when this body is wider than the platform tower. A significant concentration of forces occurs at this point, causing this area to be particularly sensitive to fatigue failure. The solution that is usually considered for platforms of this type consists of arranging transition parts with a series of reinforcements that provide greater structural stiffness to the section in this area such that such a sudden change in area is offset.

Patent US2019264656A1 relates to a transition part between the reinforced concrete body of a floating platform and the steel tower supporting a wind turbine. The transition part has a hyperboloid shape allowing for a more even distribution of the forces produced in the attachment between said tower and the body of the platform. The present invention, consisting of vertical tanks having a quasi-cylindrical shape arranged in a staggered manner, also has an even distribution of the loads from the floating structure to the tower of the wind turbine, but in this case the attachment is achieved from one of the quasi-cylindrical sections of the intermediate body, which will end up supporting the tower. If the quasi-cylinder and the tower of the wind turbine have different diameters, the prolongation of the quasi-cylinder will have a gradual reduction in diameter until being adapted to the base of the tower of the wind turbine.

In general, the greatest problem encountered by concrete structures is that this material scarcely supports bending loads, tensile loads, or shear forces. The manner in which this problem is usually solved at present in the industry is by adding a large amount of reinforcement steel (framework) in the concrete construction. Furthermore, since concrete works well under compression, if needed, prestressed steel, which increases the bending load, tensile load, or shear forces concrete can withstand when compressed, is incorporated. This method furthermore entails certain technical difficulty during the construction process, raising costs associated with building the platform.

Invention U.S. Pat. No. 3,974,789A relates to a floating structure made of reinforced concrete formed by attaching several bodies having a hexagonal section and arranged in the form of a honeycomb. The inside of the hexagonal bodies is used to store hydrocarbons or ballast water. The difference in pressures existing between the reinforced concrete walls of the hexagonal bodies, due to the difference in fluids and drafts between faces, generates a series of forces on the structure which require a high steel content in order to ensure the structural integrity of the assembly. The present invention consists of vertical tanks having a quasi-cylindrical shape arranged in a staggered manner and, since it has openings in the middle of the structure which are directly connected to the sea, a natural prestressing state causing the concrete to work under compression is achieved, preventing the failure of the structure due to tension and bending. The framework contained in the concrete is thereby reduced, and, therefore, a structurally simpler solution is obtained. Furthermore, compression prevents the occurrence of fractures or cracks in the reinforced concrete, reducing the permeability of the structure.

There is also an important problem due to external factors with respect to platforms themselves that affects the viability of using floating platforms as a system for supporting wind turbines for producing electricity. This problem is the enormous technical difficulty that exists for installing the tower, nacelle, and blades of the turbine on the platform when the platform must first be installed at sea. These installation operations entail a risk and a high cost. The process of mounting the wind turbine on the platform in the location where it is going to operate is an operation that entails an extremely high risk and technical complexity involving a large amount of auxiliary means. The manner in which this problem is addressed in currently existing solutions is based on performing these platform installation operations in time windows in which wind and wave conditions are exceptionally good, so that the installation operation can be carried out in a safe manner and with the required precision. This happens during brief periods of time and in certain sites only a few times over the year.

Another problem is the action produced by loads resulting from the wind, waves, and currents on the platform. Said action translates into the presence of accelerations and oscillating movements induced in the platform, causing a drop in the performance of the wind turbine, as well as a deterioration of the equipment and components of the wind turbine, which experience a reduction in their service life cycle. To solve this problem, there are inventions such as the one proposed in patent EP2457818A1, which uses active means such as azimuth thrusters to counteract the effects of dynamic loads acting on the platform and causing a heeling therein. The drawbacks of thruster systems for offsetting oscillations and movements induced on platforms lie in the technical complexity they add to the platform and the increase in cost associated with same, both in terms of construction costs and in terms of operating and maintenance costs, since they increase the amount of equipment and components installed on the platform.

Other inventions, such as the one described in patent CN109941398A, use passive methods for reducing oscillations on the platform. In this latter case, the method consists of providing a crow's foot mooring system in which each mooring line branches off into two lines, one line working as a simple catenary and the other line working with a prestressing applied thereon, with both lines being secured to the platform at points at different heights and reducing oscillations to which the platform is subjected. The drawback in systems of this type is that the level of prestressing to which part of the lines is subjected is magnified under very harsh environmental conditions, where it could cause these lines to break.

Another problem affecting floating platforms with wind turbines, and also caused by the action of the wind and waves, is that there is a heeling moment produced by the wind on the wind turbine causing the latter to adopt a heeling position during its operation. In this condition, the action of the waves causes a series of oscillations of the wind turbine around said heeling position, thereby reducing the performance of the wind turbine and its components. To solve this problem, there are also patents, such as JP2017074947A, that include active methods acting on the mooring lines, adjusting the degree of stress to which said lines are subjected, such that depending on environmental conditions affecting the platform, oscillations on same are reduced.

Document WO 2014/013098 A1 discloses a semi-submersible platform and a method for its construction. The platform comprises an inner column and at least four outer columns made of reinforced concrete. Each column comprises a resistant base, a shaft and a section located at a predetermined height and having a greater resistance. The platform also comprises a plurality of beams at said predetermined height, which connect the outer columns with the inner column and the adjacent outer columns between them, and a plurality of anchor lines anchored to the more resistant section of each outer column. The platform also comprises a lower plate on which the columns are secured and which is reinforced with a plurality of beams that connect the base of each outer column to the base of the inner column and to the base of each adjacent outer column.

Document WO 2019/070140 A1 discloses a floatable offshore wind turbine foundation having a suction anchoring system. The foundation is composed of three main components: the float/anchor unit, the metallic support and a transition piece. Each float/anchor unit is formed from a plurality of buoyant anchoring columns and a plurality of connection beams. The metallic support connects the float/anchor unit to the transition piece and the transition piece connects the metallic support to the wind turbine mast.

Document CN 110 453 711 A discloses a foundation of ocean engineering with an elastic transition section structure and a construction method thereof. The elastic transition section multi-cylinder-foundation structure comprises a plurality of steel cylinder foundations with the central point being connected into a circle. Said cylinder foundations are welded together, a steel top plate is connected to the upper parts of the same, a concrete plate is arranged on the steel top plate, beam plate systems are distributed on the concrete plate, a concrete transition section is located on a middle ring beam, a steel tower cylinder is connected to the upper part of the concrete transition section in an embedded mode, and the junction of the upper part and the lower part of the steel tower cylinder is in contact with the concrete transition section and an inner ring beam through elastic buffer devices.

Document US 2012/155967 A2 discloses a spar platform that comprises one or more continuous-fiber composite tubes formed in a vertical or horizontal orientation using a modified vacuum-assisted resin transfer molded process. It is fabricated at or near the intended site use of the platform. The spar platform includes in some embodiments a relatively longer central tube and relatively shorter peripheral tubes. In some embodiments, the spar platform is a single long tube. In other embodiments the spar platform supports a wind turbine assembly.

DISCLOSURE OF THE INVENTION

The present invention consists of a floating platform made of reinforced concrete for the wind industry the technical features of which allow overcoming the problems described above in the state of the art. The geometry of the platform consists of a series of vertical tanks having a quasi-cylindrical shape arranged in a staggered manner, having openings in the middle of the structure which are directly connected to the sea. This allows the reinforced concrete assembly thereof to work under compression against a group of loads to which it is subjected, instead of working under bending, as current concrete structures in this industry normally do. This technical advantage translates into better structural behavior of the platform, higher resistance against the propagation of fractures, a reduction of platform framework contained therein, and greater operating safety of this platform.

The platform described in the present invention can operate, as a result of the versatility conferred to it by its very geometry, at different drafts depending on the needs that arise, where there can be achieved floating platform concepts in which the platform is submersed with the exception of the wind turbine and the tower, or towers when there are several towers where one tower supports the wind turbine; and there can also be achieved floating concepts in which the platform is not entirely submersed but rather has a part that is above the water line. This fact not only allows the platform to be designed for either option, but the platform itself is also capable of operating in these two different manners throughout its service life: during transport it has one draft, and it is changed for operation. Furthermore, this technical advantage allows adapting the platform to areas with very different physical characteristics, such as depth of the sea floor, wind conditions, wave conditions, etc.

As a result of its technical features, the platform of the present invention solves the problem affecting certain floating platforms in the offshore wind industry such as TLPs and requiring the mounting of the tower, nacelle, and blades at sea, where the platform will operate. The geometry of the platform allows it to be able to float with a low draft, like a barge (i.e., partially submersed) and to maintain good stability while being towed with the wind turbine installed on the platform. This fact allows the mounting operation for mounting the wind turbine on the platform to be done at port, where wave conditions are much gentler than at sea, and being able to use to that end a land-based crane, which is considerably more cost-effective than a crane vessel. The technical complexity associated with said mounting operation, as well as the risk associated with this operation and, as a result, the costs involved in mounting the wind turbine on the platform, are thereby greatly reduced. Once the wind turbine is attached to the structure of the platform, said platform can be transported by means of towing, without needing any auxiliary stability means, to the position where it will operate, and once there, it can be moored.

The simplicity of the platform furthermore involves a considerable cost reduction due to its constructive ease and less framework used compared to other floating platforms existing in the sector.

The platform described in the present invention has a system for anchoring the mooring lines to the platform in the form of a planar latticework based on structural elements made of prestressed concrete arranged in a triangular shape in the high part of the platform and having a dual purpose. On one hand, it receives the loads caused by the mooring lines on the platform, evenly distributing these loads across the entire body made of reinforced concrete of the platform, thereby contributing to the good structural behavior which the platform already has due to its geometry. On the other hand, said latticework solves the problem described in the state of the art in which the attachment between the tower of the wind turbine and the body of the platform produces a high concentration of stresses at the intersection of both areas, which causes this area to be particularly sensitive to the shear forces produced on the wind turbine by the action of the wind and the movements of the platform, with there being a structural problem in this area. The arrangement of the latticework in the high area of the platform achieves there being a larger area for distributing shear forces, such that these forces are more evenly distributed to the body of the platform.

The geometry of the platform of the present invention, in which the section of the assembly of the platform is significantly larger than the tower supporting the wind turbine, and where the platform completely or partially fills the tanks with water, confers to the platform a large displacement (volume), allowing it to have its own high periods, which are readily distant from the typical periods of the waves. This reduces accelerations of the platform, conferring better operating conditions to the equipment and components of the wind turbine with regard to movements and accelerations they experience, and therefore improving their service life cycle.

The action of the wind on the wind turbine in floating platforms is the cause of a heeling moment in the platform which leads it to remain in an inclined position, with oscillation movements around said inclined position occurring as a result of the waves. This causes a considerable reduction in the performance of the wind turbine, given that said wind turbine works around a heeling situation of the platform. Since the platform of the present invention has a body with a large horizontal section in which ballast tanks are housed in the quasi-cylinders, it is capable of correcting the heeling caused by the action of the wind by means of transferring water between corresponding ballast tanks to counteract the heeling moment, unlike classic SPAR platforms having a single body in which this possibility does not exist.

The present invention shows the following innovative features compared to the background described above, applicable to the offshore wind industry, substantially improving the response of offshore floating wind platforms made of reinforced concrete to wind, waves, and current:

- The geometry, which allows the loads produced on the platform by hydrostatic pressures to which said platform is subjected during operation naturally provide the assembly of the concrete body of the platform with a prestressing that improves the structural behavior thereof and minimizes bending loads. This quality provides higher strength and reduction of fractures in the concrete structure.
- A modular geometry providing versatility to the solution, where low draft SPAR, semi-submersible, barge, or buoy solutions can be configured, and with the wind turbine being arranged such that it can be both centered and off-center. The geometry can thereby be adapted to areas with different physical and environmental characteristics.
- A stable solution with the wind turbine mounted thereon and with a low draft, allowing the wind turbine to be installed at port, preventing expensive and high-risk installation operations at the operating site. The platform, tower, and wind turbine are transported to the operating site in an already mounted state. This is possible because the entire assembly is stable when it does not have water in its tanks, working in such case as a barge with a low draft. When it reaches the installation location, the platform introduces water in the tanks, increasing the draft until reaching the operational draft, and the assembly being stable throughout the entire immersion process.
- The time windows for installing the platform are increased because crane vessels for installing the wind turbine at the site are dispensed with.
- The planar latticework made of prestressed concrete for anchoring the mooring system to the platform provides greater strength to same, reducing the risk associated with its operation and substantially increasing the service life of the structure. The technical complexity in the constitution of the platform is reduced, since it is not necessary to perform prestressing processes on the concrete forming the platform, and a minor amount of framework is required during construction.
- The shapes of the submersed concrete body of the platform provide a very low response in accelerations induced in the platform by waves. This translates into an improved performance of the wind turbine, which works under very low heeling conditions and oscillations.
- A SPAR solution optimizing the performance of the wind turbine as it is capable of correcting the heeling moment produced by the wind as a result of the movement of the liquid ballast between tanks.

BRIEF DESCRIPTION OF THE DRAWINGS

To complement the description that is being made and for the purpose of helping to better understand the features of the invention, a set of drawings is attached as an integral part of said description in which the following is depicted in an illustrative and non-limiting manner.

PREFERRED EMBODIMENT OF THE INVENTION

Therefore, an object of the present invention is to provide a solution for a floating wind platform made of reinforced concrete for mass production and characterized by a geometric design providing a hydrostatic natural prestressing to the concrete, causing it to operate in its most effective mode, i.e., under compression, improving the structural response of the platform and preventing the occurrence of fractures or cracks in the concrete, which reduces permeability and allows for reducing the framework to be contained in the structure, also increasing operational safety. The present invention has a system for anchoring the mooring lines to the structure in the form of a latticework made of reinforced concrete which evenly distributes mooring stresses, minimizing prestressing in the high area of the platform, and increasing the area for distributing shear forces due to the change in section between the platform and the tower of the wind turbine. The geometric design furthermore confers the versatility of being able to adopt low draft SPAR, semi-submersible, barge, or buoy solutions, with the wind turbine being installed such that it is centered or off-center on the structure, thereby being adapted to different draft requirements or environmental and logistics conditions.

Figure 4:
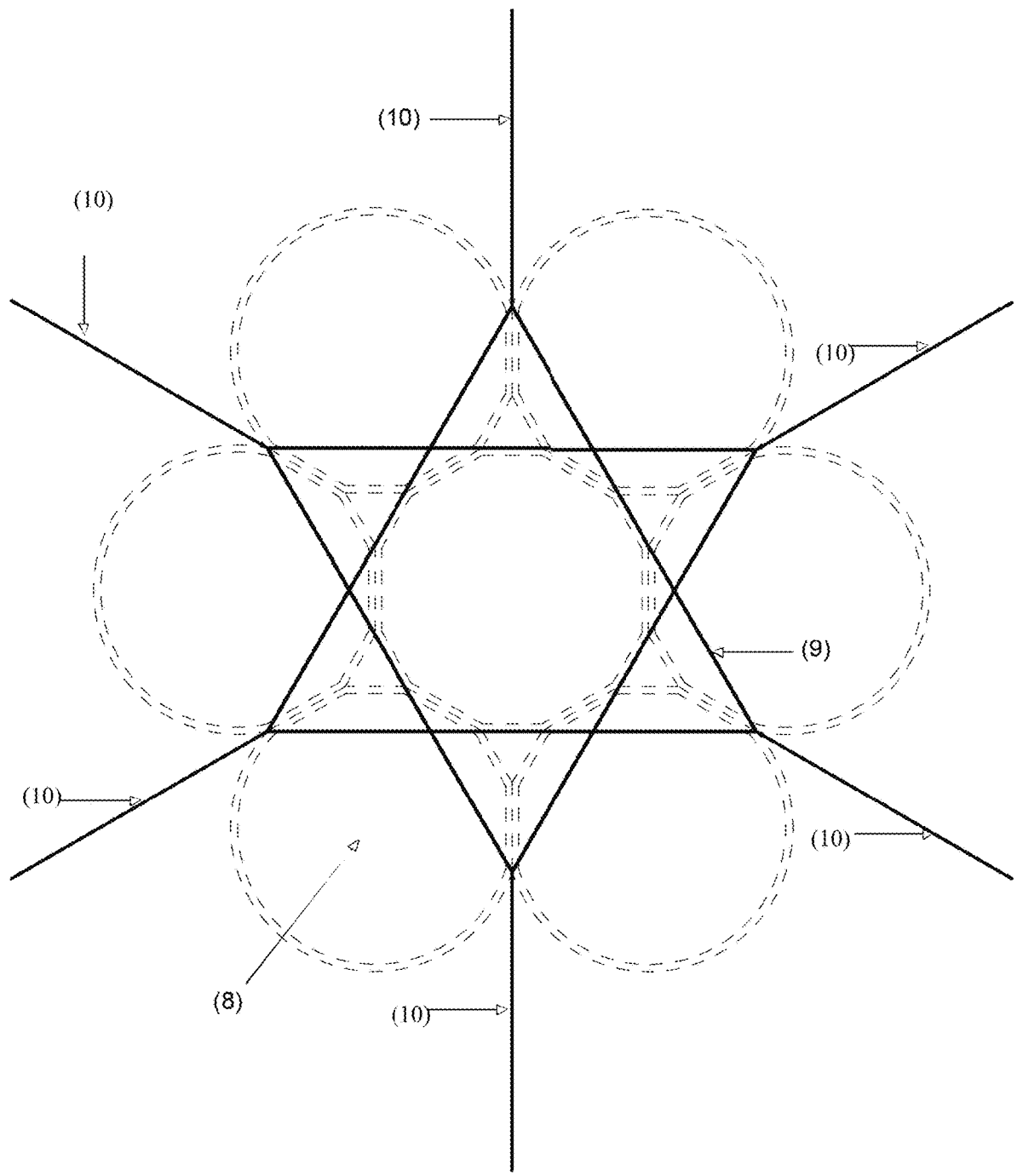
FIG. 4 shows a schematic depiction of the arrangement of the planar latticework (9) made of prestressed concrete, in one of the possible configurations that can be obtained from the platform. The manner in which this planar latticework (9) distributes stresses coming from the mooring lines (10) over the intermediate concrete body (2) of the platform is shown.

The present invention consists of a floating platform made of reinforced concrete applicable to the offshore wind industry for supporting a wind turbine in which three parts are distinguished (FIG. 2): a lower body (1), an intermediate body (2), and an upper body (3) on which a single offshore wind turbine is arranged. The platform has a spread moored type mooring system (FIG. 4) made up of at least three lines (10), arranged spaced apart as equally as possible.

The lower body (1) of the floating platform made of reinforced concrete applicable to the offshore wind industry for supporting a wind turbine (FIG. 2) consists of a planar concrete base the objective of which is to provide structural support to the rest of the platform which is supported on said body, and also to contribute low weight to the platform, thereby improving stability thereof.

The intermediate body (2) of the floating platform made of reinforced concrete applicable to the offshore wind industry for supporting a wind turbine consists of a single concrete body formed as a vertical extrusion with a horizontal section (FIG. 3) consisting of a staggered arrangement of at least five adjacent quasi-circles (6) with a straight contacting segment between same. The inner space (8) of each quasi-circle is a leak-tight space capable of housing a combination of solid and liquid ballast.

In the arrangement of the intermediate body (2) described above (FIG. 3), there are a series of inner openings (7) formed by every three quasi-circles (6) contacting one another. Said inner openings (7) are open at the upper area of the platform and communicated with the outside through their lower part. The purpose of said openings (7) is to remain filled, as a result of their connections with the outside, in a manner that is consistent with the draft the platform has at all times. Equilibrium of the hydrostatic pressures to which the platform is subjected when it is partially or completely submersed is thereby achieved. As a result of this equilibrium of pressures, the concrete walls forming the intermediate body (2) of the platform (FIG. 2) thereby naturally adapt to certain compression prestressing as a result of the mentioned pressures, favoring the good structural behavior thereof.

The upper body (3) of the floating platform made of reinforced concrete applicable to the offshore wind industry for supporting a wind turbine (FIG. 2) of the present invention is arranged on the intermediate body (2) described above and consists of a series of enclosures such that each enclosure is arranged on each quasi-circle (6) forming the horizontal section of the intermediate body (2) in the highest section of said body (2), with the exception of at least one of said sections (6), on which a prolongation of said section is arranged to form a tower (4) that is raised above the rest of the platform, and on which the support for the wind turbine of the platform will be arranged.

The geometry of the enclosures (5) existing on the intermediate body (2) (FIG. 2) is different depending on the platform concept provided in relation to the degree of submersion thereof, as discussed above.

Figure 6:
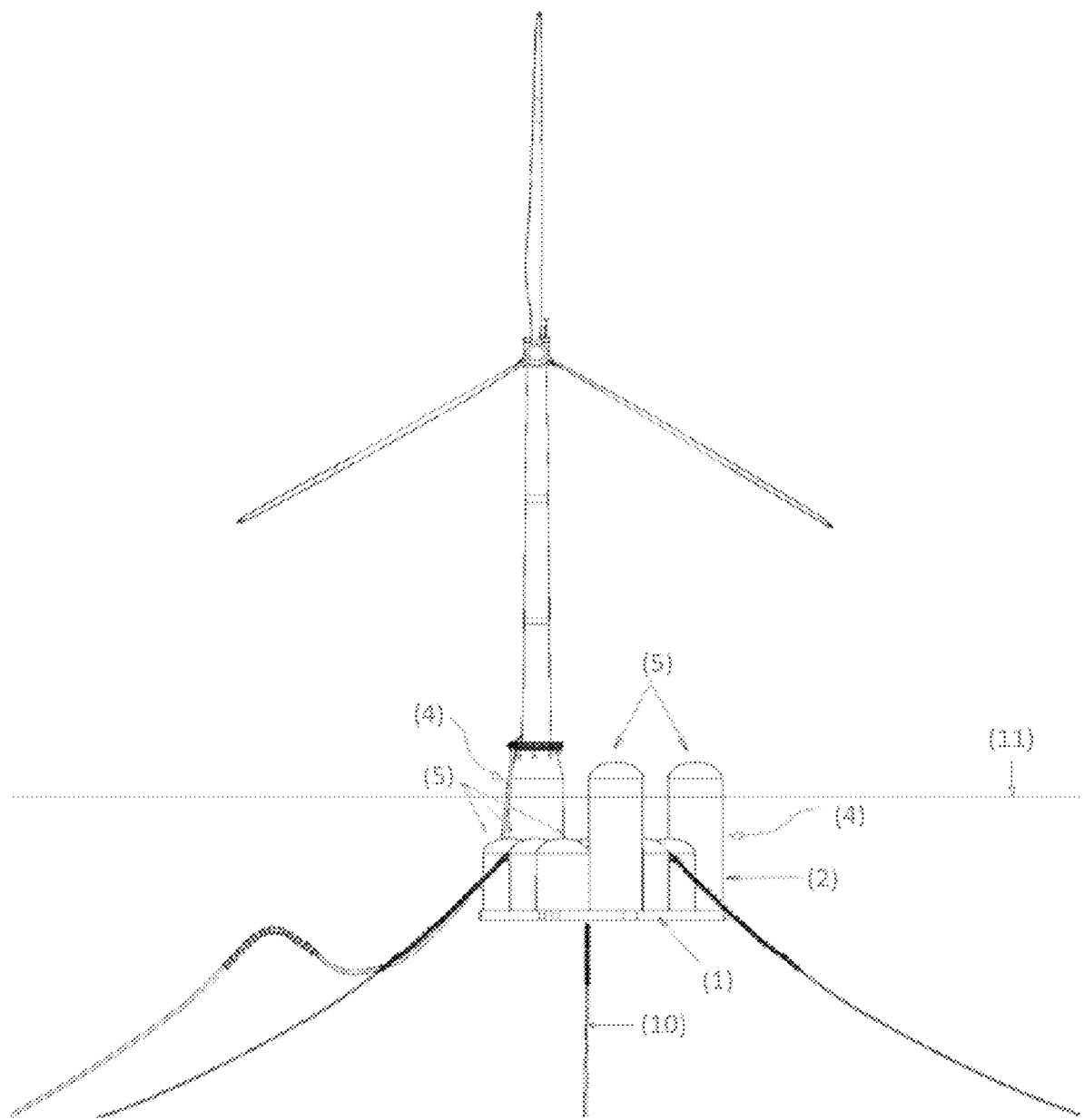
FIG. 6 shows a profile view of one of the possible configurations, in this case a semi-submersible type of configuration, of the floating platform defined in this patent. The figure shows how various towers (4), including the one supporting the tower of the wind turbine, are located above the surface of the water (11), thereby providing to the platform the inertia needed to be stable during the installation and operating phases.

On one hand, the floating platform made of reinforced concrete applicable to the offshore wind industry for supporting a wind turbine is capable of operating when submersed, with only part of the towers (4), where one supports the wind turbine if there is more than one tower (4), and the wind turbine itself being located above the surface of the sea (11) (FIG. 6). In this situation, the stability of the platform is largely obtained as a result of the concrete base forming the lower body (1) of the platform, which keeps the center of gravity of the rig as low as possible. In this configuration, the enclosures (5) of the intermediate concrete body (2) consist of a series of domes arranged on each quasi-circle forming the section of the intermediate body (2) of the platform, with the exception of those quasi-circles (6) on which the towers (4) are arranged (FIG. 6). The purpose of these domes is to receive the hydrostatic pressure to which they are subjected when the platform is submersed and to transmit the loads produced by said pressures to the intermediate body (2) such that said body works under compression against these loads.

On the other hand, the floating platform made of concrete applicable to the offshore wind industry for supporting a wind turbine is capable of operating such that not the entire intermediate body (2) is submersed, but rather part of same is located above the surface of the sea. For this platform configuration, the enclosures (5) that are arranged on the intermediate body (FIG. 2) simply consist of reinforced slabs or plates, since construction-wise, it is the simplest solution, and these elements are reasonable as they are not exposed to hydrostatic pressure as they are above the water line. These enclosures (5) are arranged on each quasi-circle forming the section of the intermediate body of the platform, with the exception of the towers (FIG. 6).

The actual geometry of the intermediate concrete body (2) (FIG. 2) of the floating platform made of reinforced concrete applicable to the offshore wind industry for supporting a wind turbine allows a number of different platform concepts to be configured according to whether more or fewer quasi-circles (6) are arranged in the horizontal section (FIG. 3) forming the intermediate body (2), keeping the minimum number of these quasi-circles (6) at five, as described above. These variations, together with variations in the arrangement of towers (4) (FIG. 6) forming the upper body (3) (FIG. 2), both in number, with there being at least one, and in position in the platform, allows a wide range of platform concepts to be obtained, such as: platforms with a single tower, in which the water-plane area is relatively small and scarcely contributes to the stability of the rig since said stability is achieved by keeping the center of gravity very low, and platforms in which there is more than one tower (4) in the upper body, where one supports the wind turbine, and they are spaced out from one another to assure such an inertia of the water-plane area that is favorable to the stability of the rig assembly.

Figure 1:
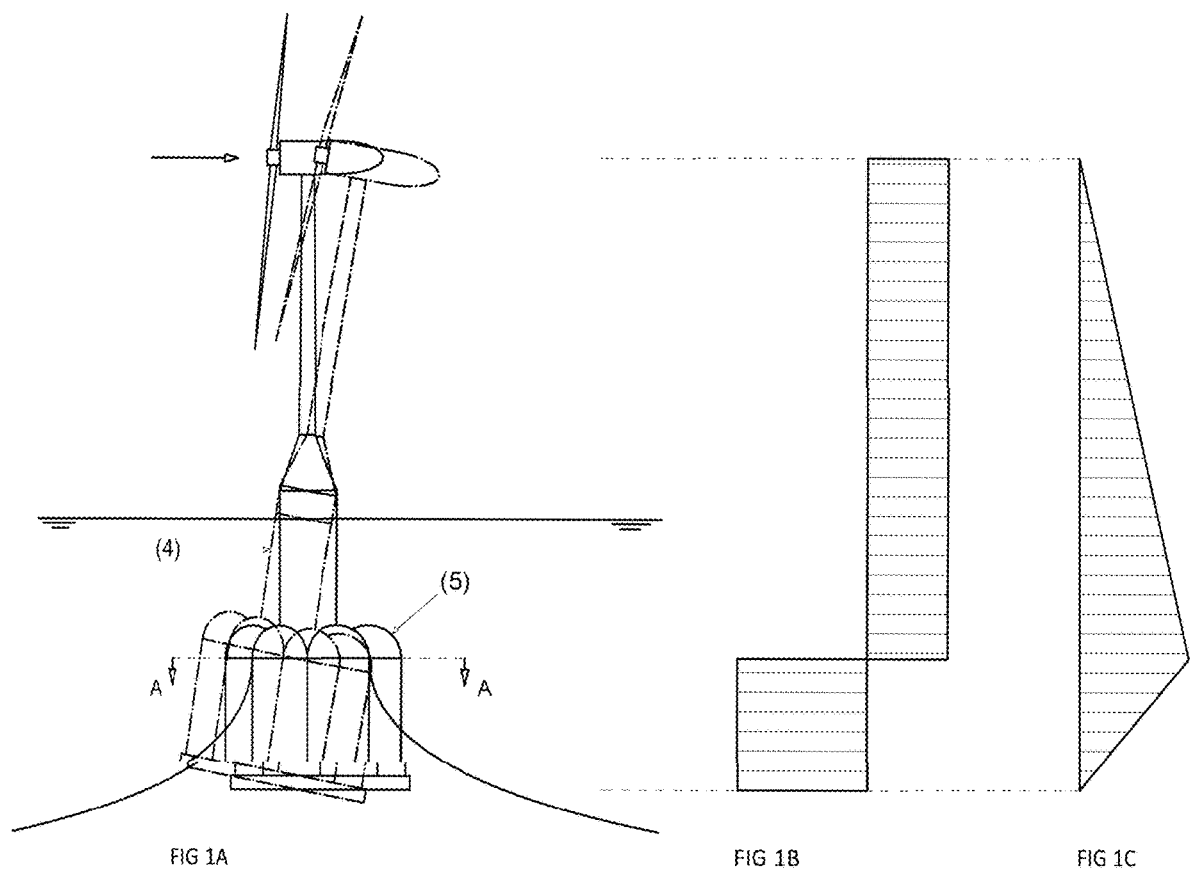
FIG. 1 shows a schematic depiction of the problem caused by the loads produced by wind on the floating platform, in which a high concentration of forces occurs in the area where the tower of the wind turbine intersects the concrete body of the platform, where the area of the horizontal section changes abruptly.
Figure 2:
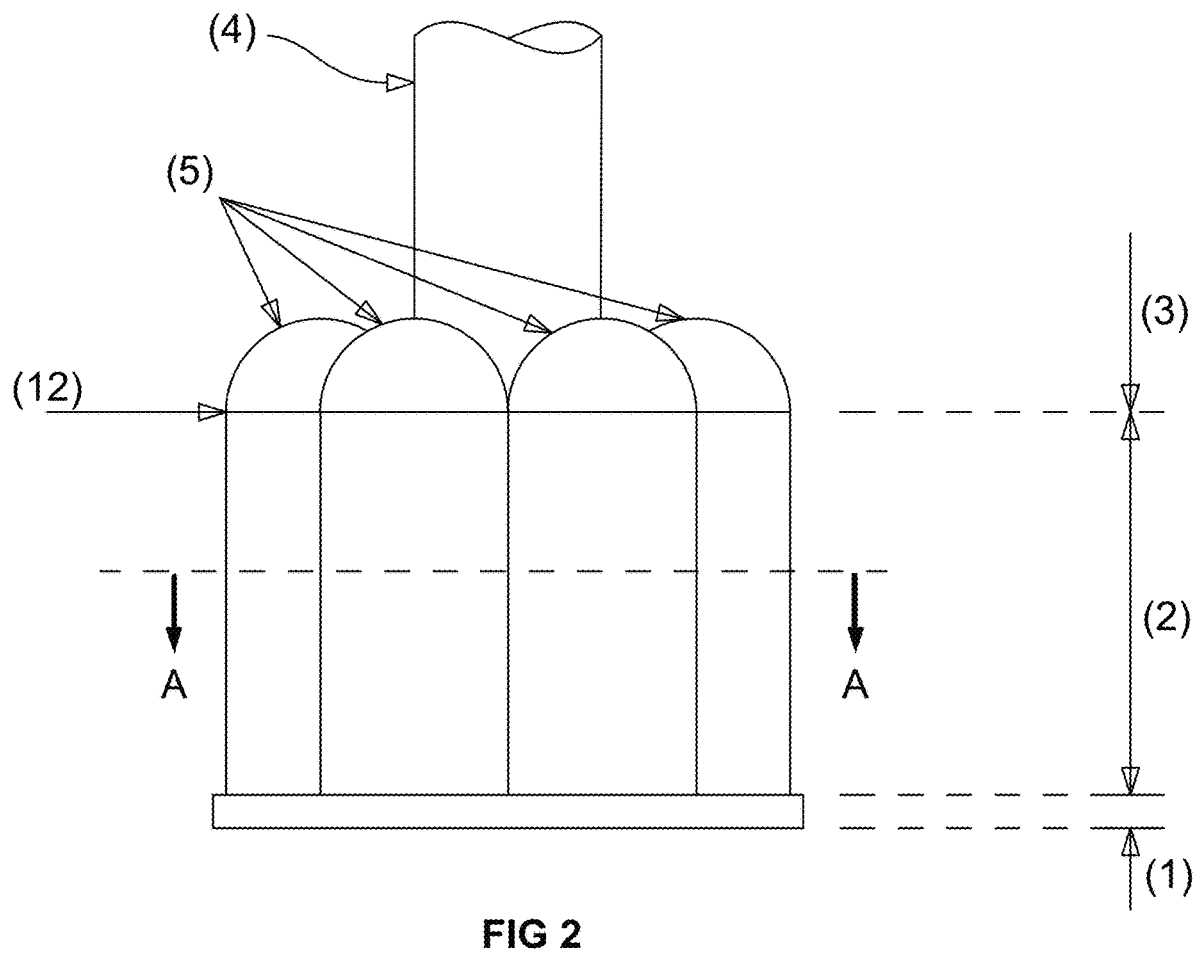
FIG. 2 shows an elevational view of one of the possible configurations of the floating platform defined herein, in which the three bodies, that is, lower body (1), intermediate body (2), and upper body (3), made of concrete and forming the platform can be seen. In this case, the upper body (3) is formed by a single tower (4) and the enclosures (5) consist of domes.
Figure 3:
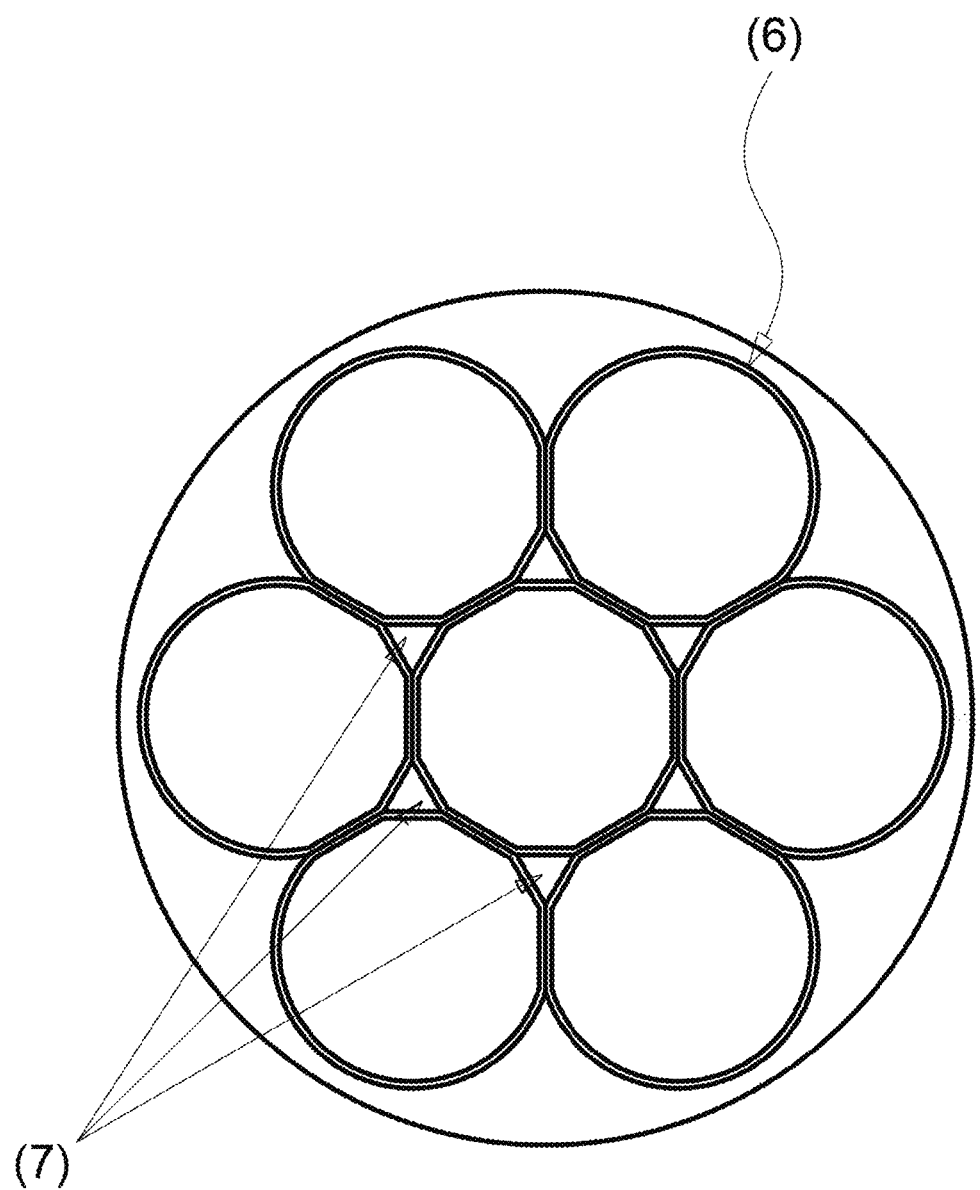
FIG. 3 shows a section view in which there can be seen the quasi-circles (6), arranged adjacently in a staggered manner with a straight contacting segment between same, the vertical extrusion of which forms the intermediate body (2) of the platform. This figure shows one of the possible configurations of these quasi-circles (6), in which the openings (7) existing between every three quasi-circular sections can be seen.

The floating platform made of reinforced concrete applicable to the offshore wind industry for supporting a wind turbine of the present invention further consists (FIG. 4) of a planar latticework (9) made of prestressed concrete which is arranged between the intermediate body (2) and the upper body (3) of the platform (FIG. 2). Said planar latticework (9) consists of at least three longitudinal elements made of prestressed concrete arranged in a triangular shape and located such that the vertexes of the triangular geometry are located in areas with straight contacting segments between the quasi-circular sections (6) forming the intermediate body (2) of the platform (FIG. 3). The mooring lines (10) of the floating platform made of reinforced concrete applicable to the offshore wind industry for supporting a wind turbine (FIG. 4) are secured on the straight contacting segments between quasi-circles (6) forming the section of the intermediate body (2) of the platform in the highest area thereof, such that there is structural continuity between mooring lines (10) and the vertexes of the planar latticework (9) made of prestressed concrete.

Figure 5:
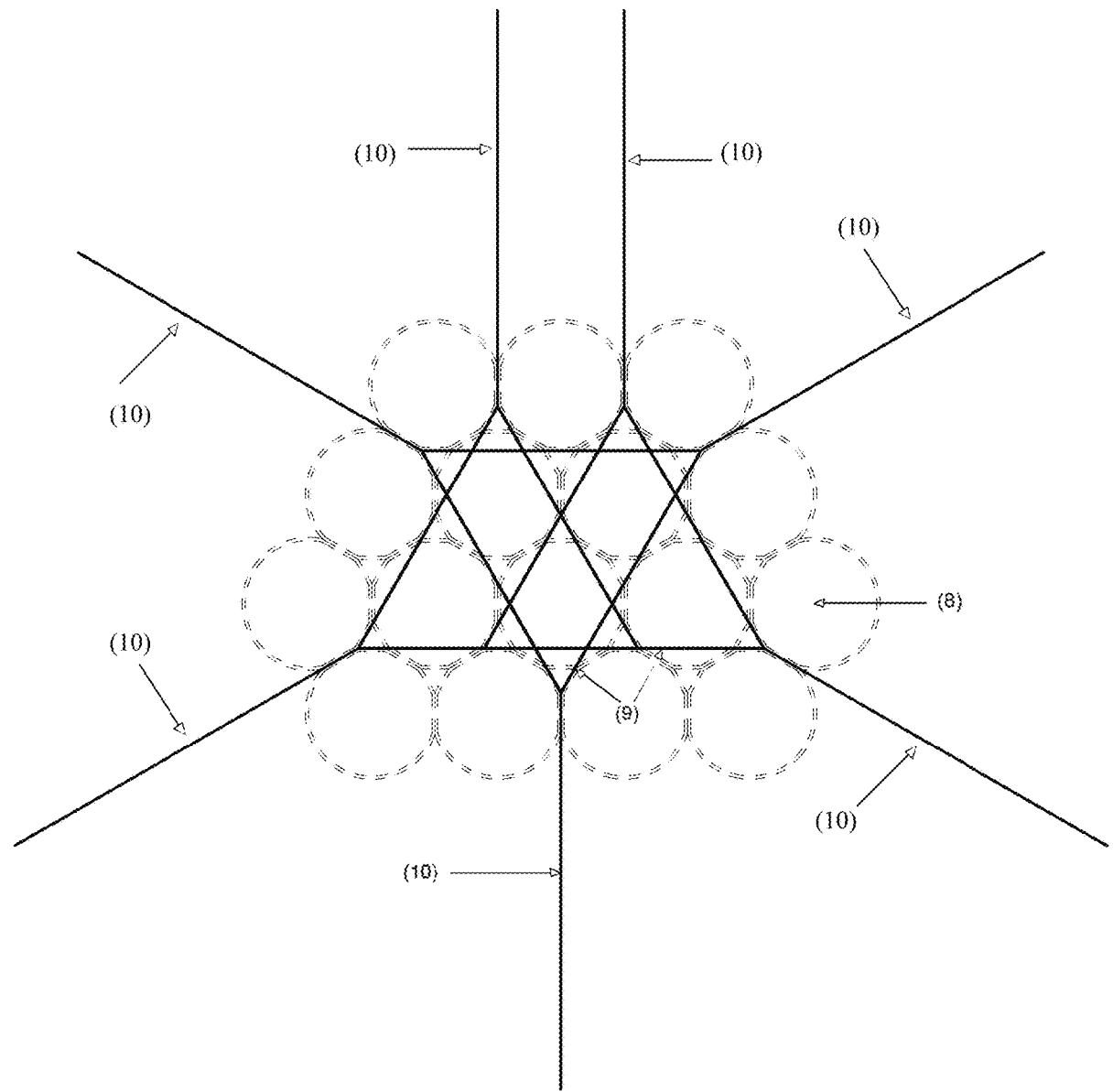
FIG. 5 shows another possible configuration that the platform can adopt by adding more quasi-circles (6) in the horizontal section forming the intermediate concrete body (2) of the platform. The manner in which the planar latticework (9) made of prestressed concrete can be adapted to variations in the geometry of the platform and the manner in which the mooring lines (10) can be arranged such that loads are transmitted to the planar latticework (9) in any variation in the geometry of the platform are also shown.

The actual configuration of the planar latticework (9) made of prestressed concrete allows being adaptable to the geometry of the floating platform made of reinforced concrete applicable to the offshore wind industry for supporting a wind turbine depending on the number of quasi-circles (6) existing in the section of the intermediate concrete body (2) (FIG. 5), such that by adding longitudinal elements made of prestressed concrete, a latticework (9) can be formed from several of these longitudinal elements arranged in a triangular shape. This feature confers certain versatility to the mentioned latticework (9) that renders it suitable for any of the possible configurations that the floating platform made of reinforced concrete applicable to the offshore wind industry for supporting a wind turbine of the present invention can adopt.

The invention has been described in reference to specific cases without departing from the general scope of the invention as defined in the attached claims. For this reason, the specification and, therefore, the drawings are neither restrictive nor limiting and must be understood as an example.

The invention claimed is:

1. A floating platform made of reinforced concrete applicable to the offshore wind industry for supporting a wind turbine, characterized by:
    (a) a lower body consisting of a planar base made of reinforced concrete;
    (b) a single intermediate body made of reinforced concrete formed by a vertical extrusion with a horizontal section consisting of an arrangement of at least five adjacent quasi-circles with a straight contacting segment between the quasi-circles and arranged in a staggered manner; with an inside of each one of the quasi-circles being a leak-tight space and inner spaces formed by every three of the quasi-circles being hollow spaces and directly connected with a sea;
    (c) an upper body on the intermediate body formed by at least one tower which is a prolongation of one of the quasi-circles and serves as a support for the wind turbine; and
    (d) a mooring system by means of lines connecting the platform to a sea floor.

2. The floating platform made of reinforced concrete applicable to the offshore wind industry for supporting the wind turbine according to claim 1, characterized in that enclosures of the intermediate body are domes and wherein each dome is arranged on each of the quasi-circles forming the section of the intermediate body made of reinforced concrete.

3. The floating platform made of reinforced concrete applicable to the offshore wind industry for supporting the wind turbine according to claim 1, characterized in that enclosures of the intermediate body are reinforced planar slabs or plates and wherein each reinforced slab or plate is arranged on each of the quasi-circles forming the section of the intermediate body made of reinforced concrete.

4. The floating platform made of reinforced concrete applicable to the offshore wind industry for supporting the wind turbine according to claim 1, wherein some of the inner leak-tight spaces of the quasi-circles have a capacity to house a combination of a solid and liquid ballast and air.

5. The floating platform made of reinforced concrete applicable to the offshore wind industry for supporting the wind turbine according to claim 3, wherein some of the inner leak-tight spaces of the quasi-circles have a capacity to house a combination of solid and liquid ballast and air.

6. The floating platform made of reinforced concrete applicable to the offshore wind industry for supporting the wind turbine according to claim 4, wherein the mooring system is characterized by:
    a plane truss made of prestressed concrete, located between the intermediate concrete body and enclosures in a form of a dome and consisting of at least three longitudinal elements arranged in a triangular shape and located such that vertexes of the plane truss are located on the straight contacting segments between the quasi-circles forming the section of the intermediate body of the platform;
    wherein the mooring lines are secured on the straight contacting segments between the quasi-circles forming the section of the intermediate body of the platform in a highest area thereof, with there being structural continuity between the plane truss made of prestressed concrete and the mooring lines.

7. The floating platform made of reinforced concrete applicable to the offshore wind industry for supporting the wind turbine according to claim 4, wherein the mooring system is characterized by mooring lines which are secured on reinforced plates located between the intermediate concrete body and enclosures in a form of a dome.

8. The floating platform made of reinforced concrete applicable to the offshore wind industry for supporting the wind turbine according to claim 5, wherein the mooring system is characterized by mooring lines which are secured on planar enclosures.

* * * * *